United States Patent
Barkan et al.

(10) Patent No.: US 6,616,046 B1
(45) Date of Patent: Sep. 9, 2003

(54) TECHNIQUES FOR MINIATURIZING BAR CODE SCANNERS INCLUDING SPIRAL SPRINGS AND SPECKLE NOISE REDUCTION

(75) Inventors: Edward Barkan, Miller Place, NY (US); Paul Dvorkis, Setauket, NY (US); Howard Shepard, Great River, NY (US); Miklos Stern, Flushing, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/568,342

(22) Filed: May 10, 2000

(51) Int. Cl.[7] ................................. G06K 7/10
(52) U.S. Cl. ............................. 235/462.29; 235/462.25
(58) Field of Search ................... 235/462.01–462.49; 250/566, 271, 555

(56) References Cited

U.S. PATENT DOCUMENTS

| | | | |
|---|---|---|---|
| 3,716,699 A | * | 2/1973 | Eckert et al. ............ 235/462.17 |
| 4,721,860 A | * | 1/1988 | Troendle ................ 235/462.32 |
| 5,200,597 A | * | 4/1993 | Eastman et al. ............ 235/455 |
| 5,331,143 A | | 7/1994 | Marom et al. |
| 5,371,361 A | | 12/1994 | Arends et al. |
| 5,412,198 A | | 5/1995 | Dvorkis |
| 5,422,471 A | | 6/1995 | Plesko |
| 5,477,043 A | | 12/1995 | Dvorkis |
| 5,504,318 A | | 4/1996 | Joseph et al. |
| 5,543,610 A | | 8/1996 | Bard et al. |
| 5,600,121 A | | 2/1997 | Kahn et al. |
| 5,612,531 A | * | 3/1997 | Barkan .................. 235/462.27 |
| 5,637,853 A | | 6/1997 | Joseph |
| 5,648,649 A | | 7/1997 | Bridgelall et al. |
| 5,734,152 A | | 3/1998 | Goren et al. |
| 5,742,038 A | | 4/1998 | Dvorkis et al. |
| 5,808,287 A | | 9/1998 | Shepard et al. |
| 5,874,720 A | | 2/1999 | Dvorkis et al. |
| 5,874,722 A | | 2/1999 | Rando et al. |
| 5,974,066 A | | 10/1999 | Wu et al. |
| 6,024,283 A | * | 2/2000 | Campanelli et al. ... 235/462.32 |
| 6,206,290 B1 | | 3/2001 | Giebel et al. |

FOREIGN PATENT DOCUMENTS

EP          0355355       2/1990

* cited by examiner

*Primary Examiner*—Thien M. Le
*Assistant Examiner*—Jamara A. Franklin
(74) *Attorney, Agent, or Firm*—Kirschstein et al.

(57) ABSTRACT

Various techniques for reducing the size of bar code scanner modules are disclosed including embodiments having miniature moving mirror elements employing spiral tape springs and micro machined structures. Other embodiments employ VCSELs and relatively small collection areas, while minimizing speckle noise through beam shaping and signal processing techniques.

14 Claims, 9 Drawing Sheets

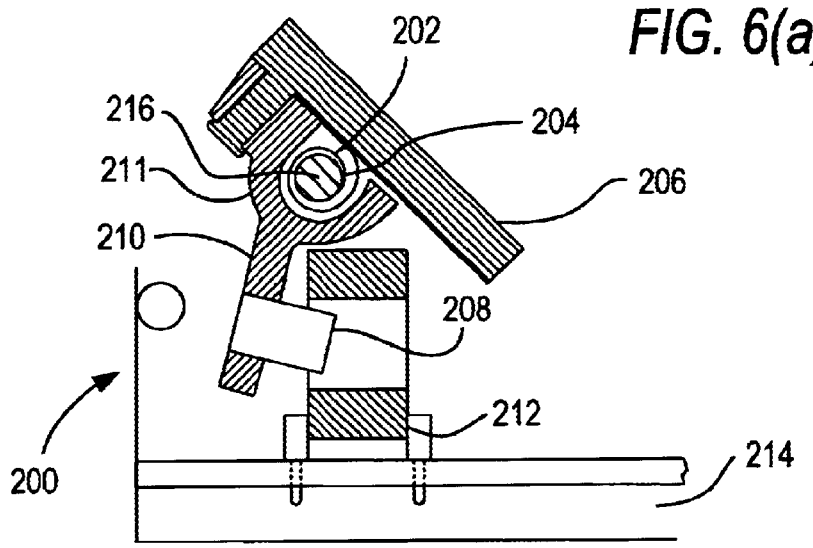
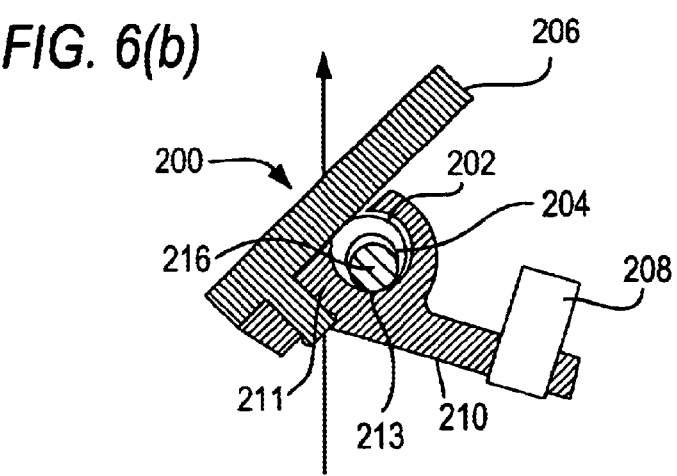
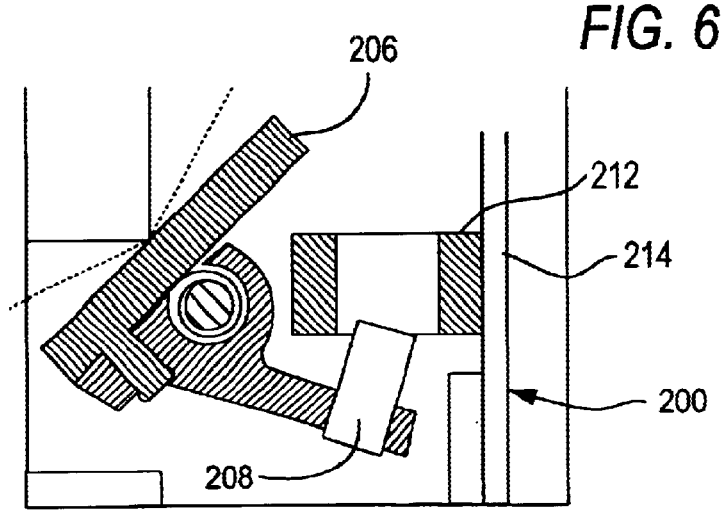

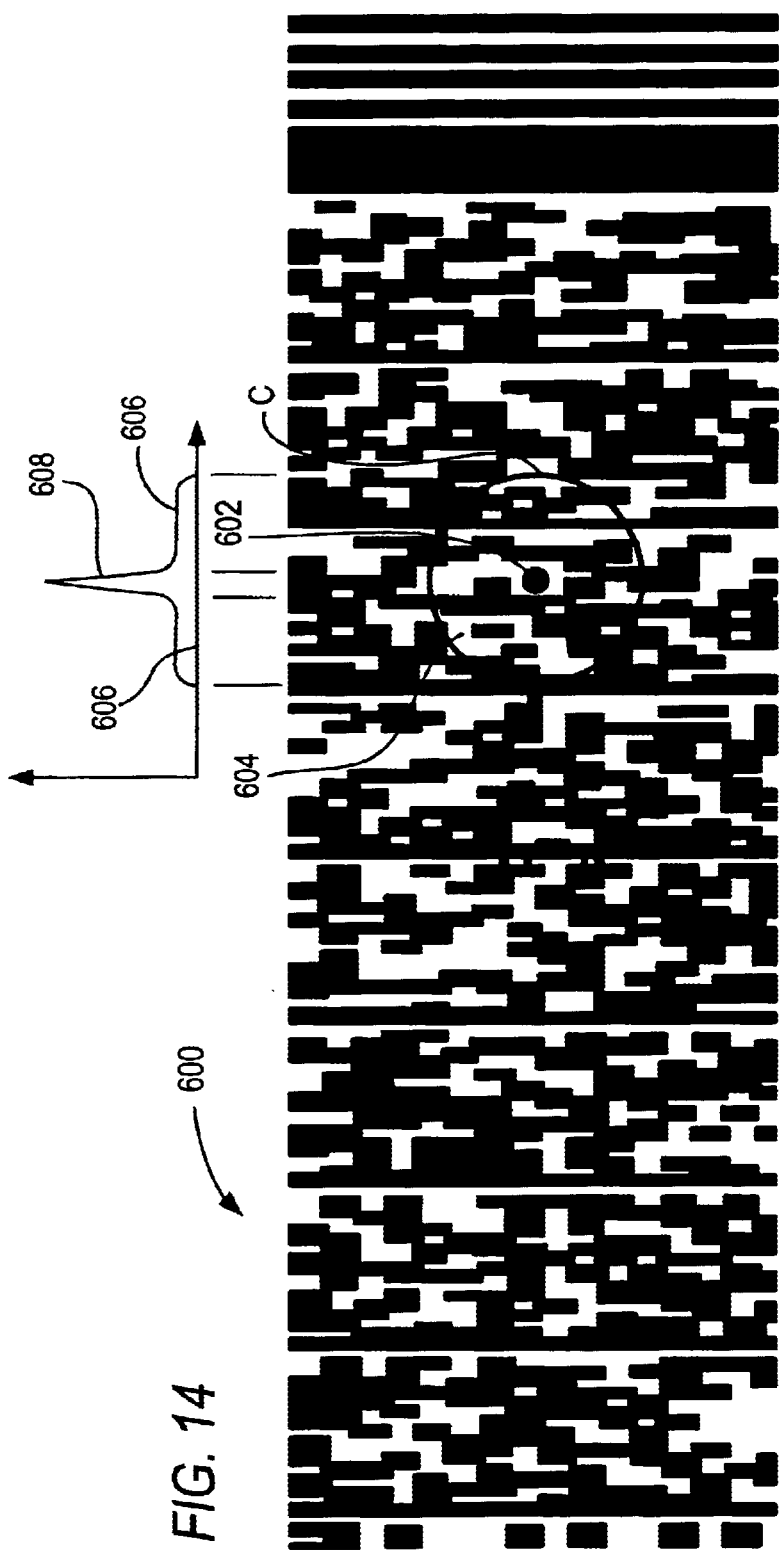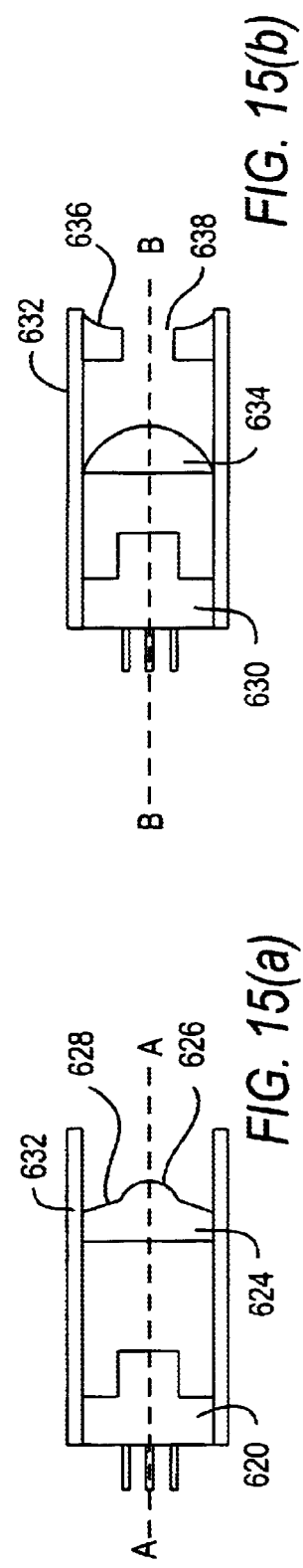

TECHNIQUES FOR MINIATURIZING BAR CODE SCANNERS INCLUDING SPIRAL SPRINGS AND SPECKLE NOISE REDUCTION

BACKGROUND

FIELD OF THE INVENTION

The present invention relates to methods and apparatus for electro-optically reading symbols, for example, bar code symbols and, in preferred embodiments, to compact hand held or hand worn laser beam scanners.

BACKGROUND AND OBJECTS

Bar code readers are known in the prior art for reading various symbologies such as UPC bar code symbols appearing on a label or on the surfaces of an article. The bar code symbol itself is a coded pattern of indicia comprised of a series of bars of various widths spaced apart from one another to bound spaces of various widths, the bars and spaces having different light reflecting characteristics. The readers in scanning or imaging systems electro-optically transform the graphic indicia into electrical signals, which are decoded into information, typically descriptive of the article or some characteristic thereof. Such information is conventionally represented in digital form and used as an input to a data processing system for applications in point-of-sale processing, inventory control and the like. Scanning systems of this general type have been disclosed, for example, in U.S. Pat. No. 5,600,121, assigned to the same assignee as the instant application. Such systems may employ a hand held, portable laser scanning device held by a user, which is configured to allow the user to aim the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol.

In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or both.

Bar code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. This light is detected and converted into an electrical signal.

Some bar code reading systems are "retro-reflective". In a retro-reflective system, a moving mirror is used to transmit the outgoing beam and receive reflected light. Non-retro-reflective systems typically employ a moving mirror to transmit the outgoing beam and a separate detection system with a wide, static field of view.

Electronic circuitry and software decode the electrical signal into a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented.

The decoding process of known bar code reading system usually works in the following way. The decoder receives the pulse width modulated digitized signal from the digitizer, and an algorithm, implemented in the software, attempts to decode the signal. If the start and stop characters and information between them in the scan were decoded successfully, the decoding process terminates and an indicator of a successful read (such as a green light and/or an audible beep) is provided to the user. Otherwise, the decoder receives the next scan, performs another decode attempt on that scan, and so on, until a satisfactorily decoded scan is achieved or no more scans are available.

Such a signal is then decoded according to the specific symbology into a binary representation of the data encoded in the symbol, and to the information or alphanumeric characters so represented. The decoded information may be stored or subjected to data processing.

Hand held bar code scanners typically used today employ a gun-shaped housing having a handle portion and a head portion which contains the scanning module. Such systems may have a volume of 25 to 50 cubic inches. Smaller bar code scanners have been proposed such as the ring scanner shown in U.S. Pat. No. 5,543,610, pen mounted systems shown in U.S. Pat. No. 5,874,722 and U.S. application Ser. No. 08/794,782 filed Feb. 3, 1997, which is hereby incorporated by reference and the compact, elongated bar shaped scanner shown in U.S. application Ser. Nos. 09/166,816 filed Oct. 5, 1998 and 09/467,905 filed Dec. 21, 1999, both of which are assigned to Symbol Technologies, Inc., and both of which are hereby incorporated by reference. Implementation of smaller scanners requires a more compact scanning module.

Accordingly, it is a general object of the present invention to provide a more compact and capable bar code scanning module.

Typically, scanning modules employ a moving scan mirror. The mirror is mounted to pivot about one or more axes of rotation and driven by a magnet/coil assembly. In conventional scanning modules, the mirror is mounted on a leaf spring, for example, of mylar, plastic or metal. In such an arrangement the leaf spring is anchored at one end to housing or chassis of the scanning module and a mirror is attached at the other end. When driven, the mirror experiences a large deflection which produces the scanning action. It has also been proposed in U.S. Pat. No. 5,422,471 to Plesko to employ one or more spiral springs to provide a restoring force in a moving scanning mirror system. See FIGS. 12 through 17 of the '471 patent, showing spiral, wire springs.

With the development of hand held scanner wands, pen scanners and ring scanners, there is a need for more compact, robust and stable moving mirror assemblies which consume relatively little power.

Accordingly, it is an object of the present invention to provide a compact scanning mirror assembly.

It is another object of the present invention to provide a scanning mirror assembly which is resistant to g-force effects.

It is another object of the present invention to provide a scanning mirror assembly with lower power requirements and sharper resonance characteristics.

It is another object of the present invention to provide a scanning mirror assembly with an accurately controllable scanning motion.

It has been proposed to use micro machined motors to provide small moving mirror structures. Such structures are described in U.S. patent application Ser. No. 09/035,763, entitled "*Control System For Oscillating Optical Elements In Scanners*" to Giebel et al., assigned to Symbol Technologies, Inc. and hereby incorporated by reference. Applicants have observed that the reduction in the size of scanning modules, particularly the use of smaller moving mirror structures, smaller detectors and smaller laser diode assemblies necessitates improvements in the construction and integration of these components to avoid degradation of the performance of the scanning system.

Accordingly, it is an object of the present invention to provide a compact scanning system which accurately and reliably reads bar code symbols.

It is a further object of the present invention to provide a robust and inexpensively fabricated, miniature bar code scanner module with performance similar to larger systems.

These and other objects and features will be apparent from the following summary and descriptions of preferred embodiments.

SUMMARY

The present invention relates to techniques and assemblies for miniaturizing bar code scanners and modules. Preferred embodiments employ a semiconductor light source for generating a laser beam projected along a first optical path to a symbol to be read. A generally planar, reciprocally oscillatable reflector is located in the first optical path, for directing the laser beam impinging on the reflector to the symbol. The reflector is supported for reciprocal oscillating movement. A drive system reciprocally oscillates the reflector. A photo detector generates an electrical signal indicative of the detected light intensity.

In preferred embodiments, the reflector is supported by a spiral tape spring with a radially outer portion attached to the reflector. More particularly, the scanning device may include an axial member, an optical component such as the mirror driven to pivot with respect to the axial member to provide a scan pattern, and a spiral spring, generally coaxial with the axial member. Advantageously, the spiral spring has an inner end portion fixed to the axial member and spirals outwardly from the axial member. The spiral spring supports the optical component for pivoting with respect to the axial member, the optical component being attached to the spiral spring at a location radially displaced from the fixed end portion of the spiral spring.

The scanning device may further include a laser for directing a light beam toward said optical component and an electromagnetic driver for driving the optical component to pivot including a magnet and a coil. A mounting bracket may be provided for attaching the optical component and the magnet to the spiral spring at the location radially displaced from the fixed end portion of the spiral spring.

The spiral spring may have a thickness T and a width W in the axial direction such that W is much greater than T. A second spiral spring may be provided for supporting said axial member to permit pivoting of the optical component about a second axis.

The oscillating optical component or reflector may be a plane mirror and the spiral spring tends to maintain the mirror plane parallel to the axis of the spiral spring. One or more stops may be provided, normally out of contact with the mirror, for preventing movement of the mirror beyond a predetermined limit. One or more of such stops may be employed to prevent telescoping of the spiral spring beyond a predetermined limit.

Another preferred embodiment of the present invention uses a vertical cavity surface emitting laser ("VCSEL") as its source of laser light. Though any type of moving mirror structure may be employed with a VCSEL light source, a micro machined motor may advantageously be used to reduce the size of the scanner.

Generally, to reduce the size of the scanning module, the size of its component parts must be reduced. In particular, the light collection area of the system may be reduced, due to reduction of the size of the moving mirror and/or reduction in the size of the detector element itself. This gives rise to increased "speckle noise". Speckle noise is a type of self interference which occurs when coherent light waves from the laser diode are scattered by irregularities in the surface bearing the bar code. The result is a granular pattern known as speckle noise which changes as the beam scans across the substrate. The changing speckle pattern gives rise to random changes in the electrical output of the photo diode, which may interfere with the detection of the bar code symbol.

The effect of speckle noise reduced by use of the following techniques or devices, alone or in combination: shorter wavelength laser diodes e.g. less than 650 nm; a cylindrical optical element or diffractive optical element in the laser focusing system to produce an elliptical spot; a non-differentiating digitizer to avoid enhancing speckle noise in close range scanning; an offset correction circuit to prevent saturation when using a non-differentiating digitizer; and a multi-bit decoder and digital filtering schemes to filter out speckle noise.

In another preferred embodiment, speckle noise is reduced by using a scanning laser beam consisting of a small central spot of a size comparable to the smallest feature of the symbol being read and an annular halo, produced by the same laser diode, which is significantly larger than the smallest feature of the symbol, thereby averaging response from black and white areas located outside of the central spot. Advantageously, as much as a third and, preferably, as much as half of the power of the laser diode is contained in the halo.

The foregoing has been provided as a convenient summary of preferred embodiments. However, the invention to be protected is defined by the claims herein and the range of equivalents properly accorded thereto.

BRIEF DESCRIPTION OF THE DRAWINGS

FIGS. 6(a)–(c) and 7(a) and (b) are side and plan cross-sectional views of a spiral spring scanning device illustrating the response of the device to g-forces;

FIG. 14 is a plan view of a two dimensional bar code laser spot and beam profile of a preferred embodiment of the present invention;

FIGS. 15(a) and 15(b) are alternative embodiments of optical systems for producing the laser spot, halo and beam profile of FIG. 14.

DETAILED DESCRIPTION OF PREFERRED EMBODIMENTS

Figure 1:
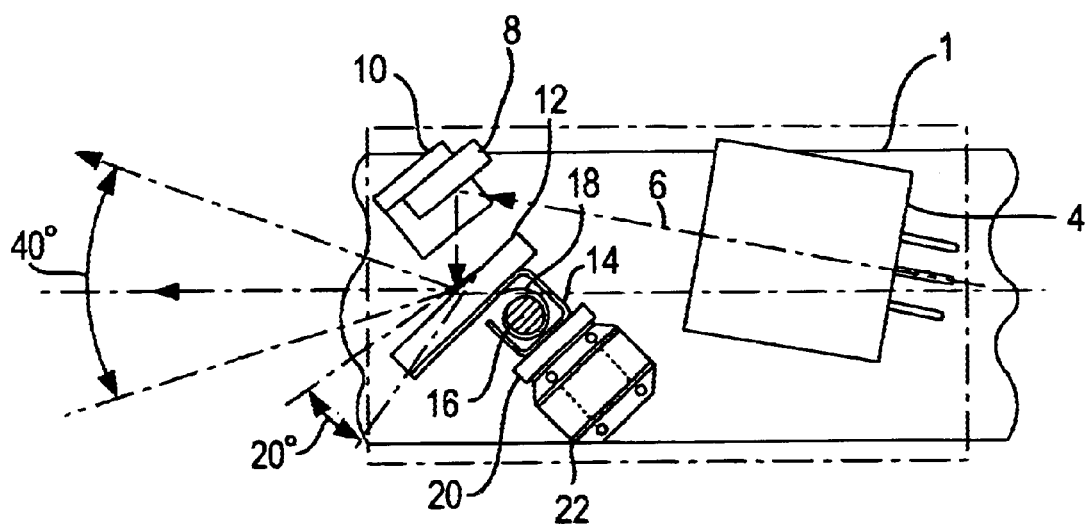
FIGS. 1 and 2 are, respectively, side and front cross-sectional views of a ring scanner employing a scanning device of an embodiment of the present invention.
Figure 2:
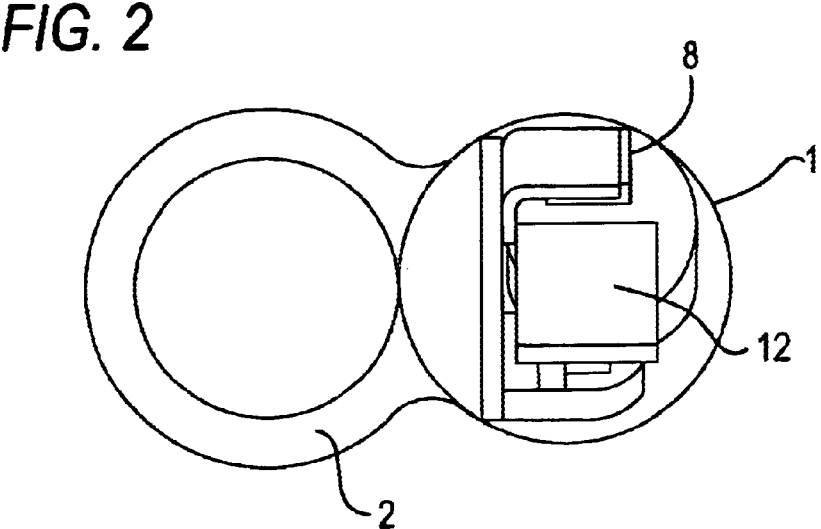

FIGS. 1 and 2 are, respectively, side and front cross sectional views of a miniature bar code scanner employing a spiral spring mechanism in accordance with the teachings of the present invention. In the system the scanner module 1 is mounted on a ring 2 adapted to be worn on a finger of the user. The scanner module 1 projects a scanner pattern through a scanner angle (e.g. 40°) in a direction generally parallel to the principle axis of the portion of the finger on which it is worn. Alternatively, because of the small dimensions of the device, the scanner module can be mounted in a cylindrical housing sized and shaped like a pen.

A laser beam is produced by laser assembly 4. Light travels from the laser assembly along optical path 6 to a folding mirror 8 mounted on bracket 10, where it is reflected towards an oscillating mirror 12. As shown in the Figure, the mirror may deflect through an angle of 20°.

The mirror is mounted on a bracket 14, which itself is rotatably mounted on a fixed shaft 16 by means of a spiral tape spring 18. A magnet 20 is also mounted on the bracket 14 and is driven by coil 22.

The structure depicted in FIGS. 1 and 2 is compact, robust, stable and consumes relatively little power.

Figure 3A:
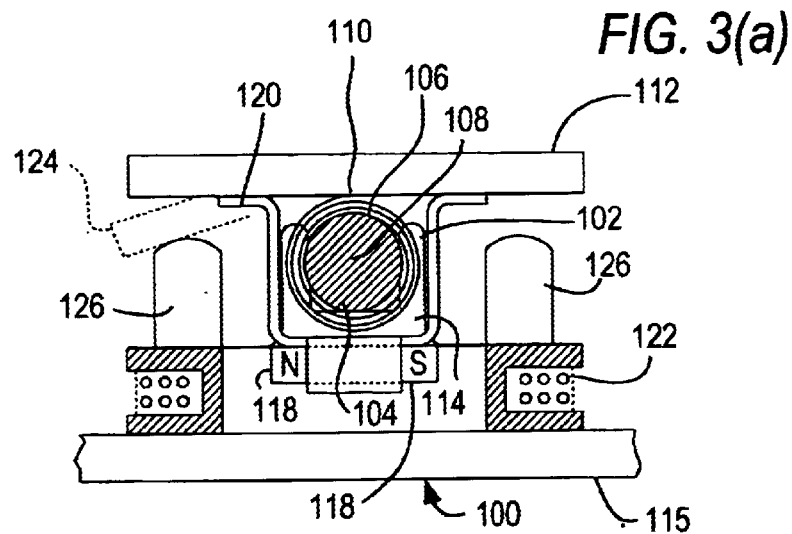
FIGS. 3(*a*) and 3(*b*) are, respectively, side and front cross-sectional views of a spiral spring scanning device of the present invention.
Figure 3B:
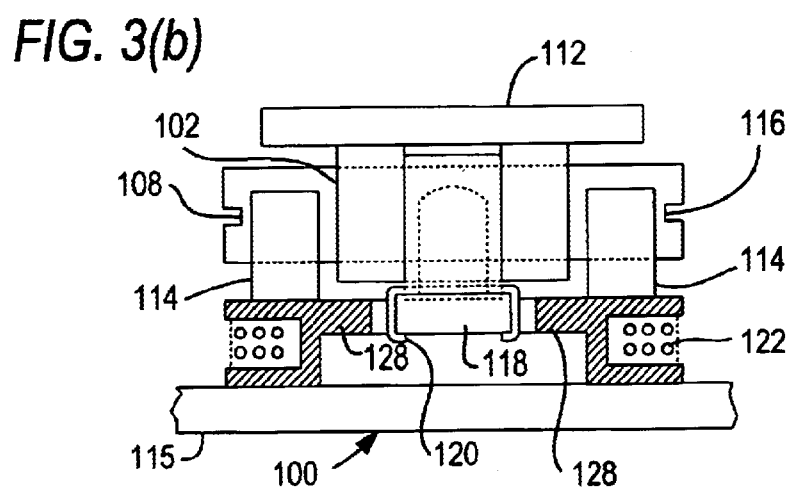

Referring now to FIGS. 3(a) and 3(b), side and front views of a spiral spring scanning device 100 are shown. The planes of FIGS. 3(a) and 3(b) are, respectively, perpendicular and parallel to a rotational axis 108 of pivoting of the scanning optics.

A spiral spring 102 is fastened to an axial member (for example shaft 104) at location 106. The attachment may be made in a conventional fashion, e.g. mechanically or with adhesive. The axial member contains the rotational axis 108. The spiral spring is wound around the shaft in one or more turns. An optical element is attached at 110, a location radially outward from the shaft and the rotational axis 108, which corresponds to the central axis of the spiral spring. The optical element may be, for example, mirror 112 attached e.g. with the aid of a mounting bracket or adhesive.

The shaft 104 may be fixedly mounted to trunnion 114, which may, in turn, be supported by a chassis 115 such as a base or printed circuit board. A slot 116 may be provided in the shaft for making trim adjustments to the mirror so that its rest position is appropriate for the optical paths employed in the scanner. It will be understood that rotation of the shaft in one direction or the other with respect to the trunnions will correspondingly rotate the point of attachment 110 about the axis 108.

An electromagnetic driver may be provided for driving the optical component in a scanning motion with respect to the shaft and chassis. The driver may include a magnet 118 mounted by means of a bracket 120 to the mirror 112. As shown in FIG. 3(a), the center of the magnet is located off of the axis 108. A coil 122 is employed to generate a time varying magnetic field which pivots the mirror 112, bracket 120 and magnet 118 about axis 108. A deflection of the mirror is indicated in phantom at 124. Limiters or stops 126 may be provided to limit the angle or degree which the mirror may pivot with respect to the chassis. The trunnions 126 and stops 128 may be employed to limit the telescoping of the spiral spring in response to g-forces experienced by the scanner. In the embodiment shown in FIGS. 3(a) and (b) the trunnions are supported on the chassis by the coil 122.

The spiral spring scanner provides a compact and robust structure. Mirror centering is readily accomplished. The spiral spring, rather than bearings, supports the mirror, thereby reducing or eliminating friction. The radial and axial deflection of the mirror and magnet is conveniently limited, thereby inhibiting shock damage to the device, particularly the spring.

Figure 4:
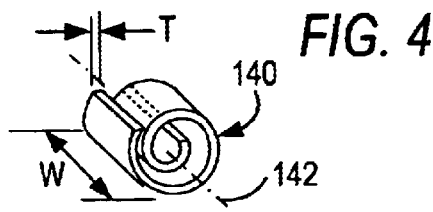
FIG. 4 is a pictorial view of a spiral tape spring.

In preferred embodiments of the present invention, the spiral spring is a tape spring. Such spring has a width W, much greater than its thickness T. Such a spring 140 is illustrated in FIG. 4. As shown, the spring has a central axis 142. The spiral nature of the spring requires only that each turn be slightly further from the central axis i.e. a sufficient degree so that the turns do not bind to each other. In other words, the radius of the spring increases monotonically and, usually continuously as the spring winds outward from the central axis. The spiral may, for example, be a hyperbolic, logarithmic or parabolic spiral or a lituus. In a preferred embodiment inside turns are wound more tightly and have smaller spacing S than outside turns.

In preferred embodiments, the optical component of the scanner is a plane mirror and the spiral spring is a tape spring. The spring tends to maintain the mirror plane parallel to the axis of the spiral spring. This, in turn, facilitates the production of a flat scan line. It will be apparent that coiling of the spring reduces the overall size of the scanning device.

The spring is made from Mylar flexible polyester film, plastic, spring metal or other elastically deformable material. The selection of material determines modulus of elasticity and temperature sensitivity of the device. This, along with dimensional parameters, determines the resonant frequency, $f_n$, of the device approximately in accordance with the relationship $$f_n^2 \alpha \frac{\mu L^3 W}{T}$$

where $\mu$=the modulus of elasticity;
L=spring length;
W=spring width; and
T=spring thickness.

For example, a BeCu spring may be used.

Portions of the active area of the spiral spring may be cut out or narrowed to control the resonance frequency. It will be understood that by elimination bearing friction, the resonance frequency of the system is sharpened and the system is longer lived. As compared to a leaf spring, the spiral spring of the embodiments of the present invention has less clamped area per spring area and therefore a higher Q.

Figure 5:
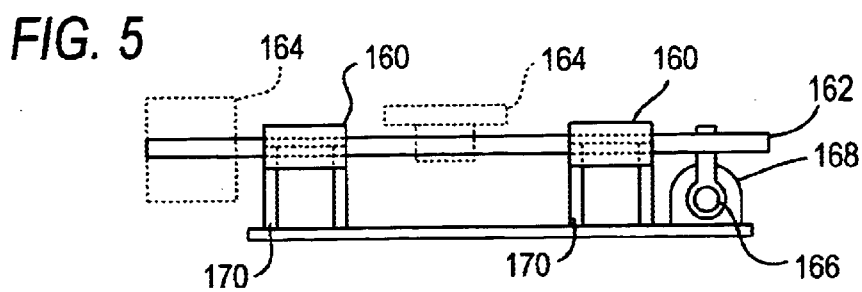
FIG. 5 illustrates an alternate embodiment of a spiral spring scanning device of the present invention.

FIG. 5 illustrates how spiral spring 160 can be used on a common shaft 162 with optical elements or mirrors 164 and a magnet 166 located at different axial positions along the shaft. In this embodiment a coil 168 may be used to drive the shaft and mirrors in pivoting motion, the shaft being supported from trunnions 170 by the spiral spring.

FIGS. 6 and 7 are side and plan and cross sectional views of a spiral spring scanning device 200 of the present invention illustrating the response of the device to driving and g-forces. A spiral spring 202 is wound abut a shaft 204. A scan mirror 206 is attached to the spring. A magnet 208 is attached to the spring by a radially extending arm 210. The arm 210 may be integrally formed with a bracket 211 to partially encircle the spiral spring and provide a base for attaching the mirror. A coil 212 reciprocates the magnet. The assembly is supported on a chassis or base 214, the magnet and mirror assembly being supported for rotation about the shaft axis 216 and the spring providing a restoring force opposing the driving force.

FIG. 6(b) shows the spiral spring scanning device after application of a g force in the direction indicated by the arrow. As shown, the shaft is decentered from the mirror-spring-bracket assembly. However, the distance of travel is limited by the spiral spring and, ultimately, by an internal cylindrical wall 213 of the bracket 211.

Figure 7A:
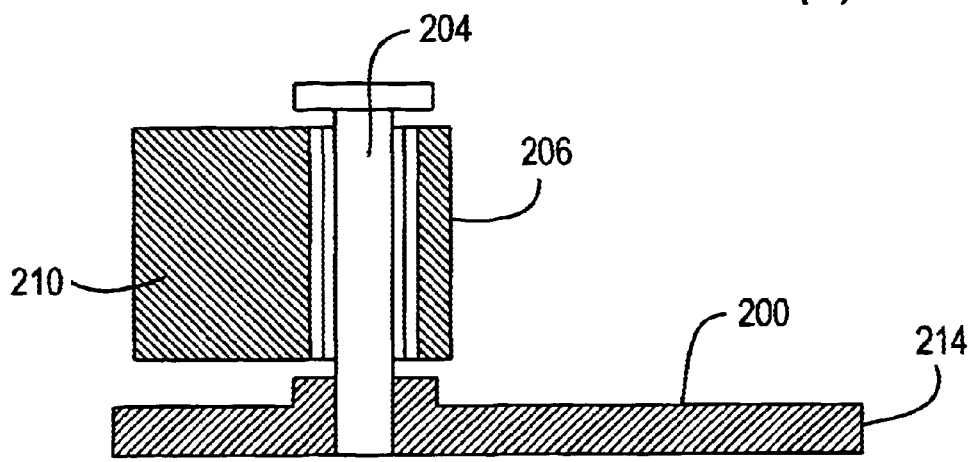
Figure 7B:
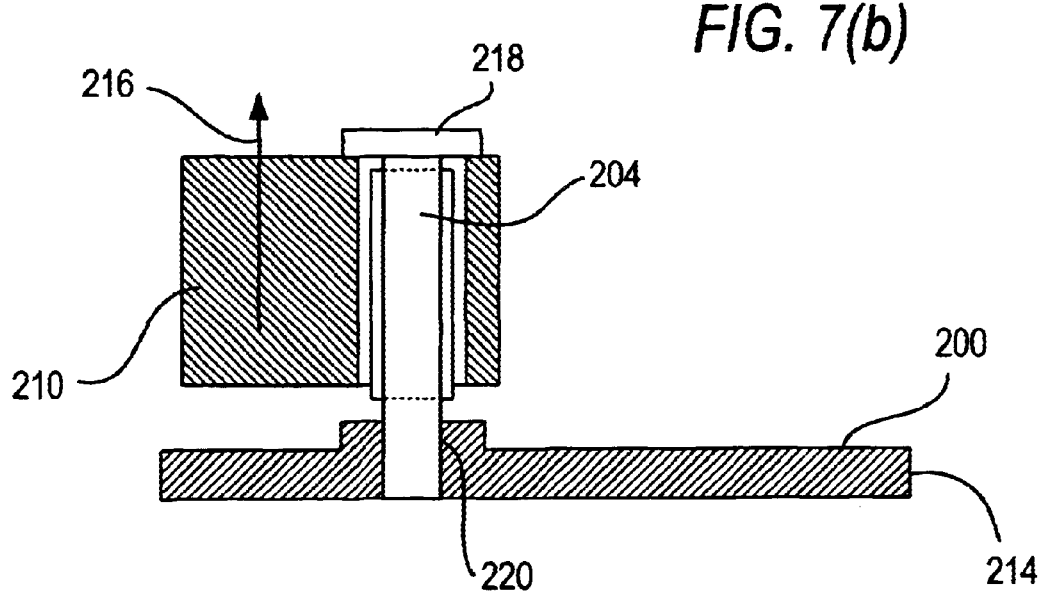

FIGS. 7(a) and 7(b) show the effect of application of an axial g force to the spiral spring scanning device. In normal operation the spring centers the mirror-spring-bracket assembly along the axis of the shaft 204 as shown in FIG. 7(a). However, in FIG. 7(b), the mirror-spring-bracket assembly has moved in the direction of the arrow 216 in response to an axially directed g-force. The distance of travel is limited by the restorative (centering) force of the spiral spring and, ultimately, by limiters 218 and 220, which may take the form of a cap on the shaft such as 218 or a portion of the base or housing of the device as is the case with limiter 220.

Figure 8A:
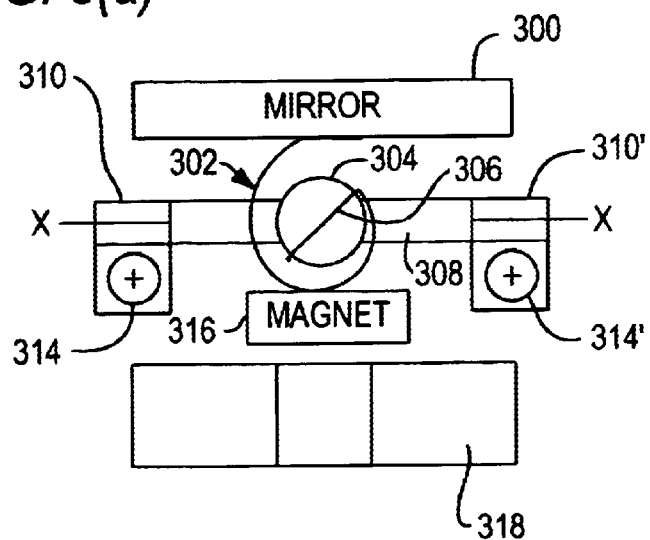
FIGS. 8 and 9 illustrate two dimensional scanning devices and spiral springs and magnets therefor.
Figure 8B:
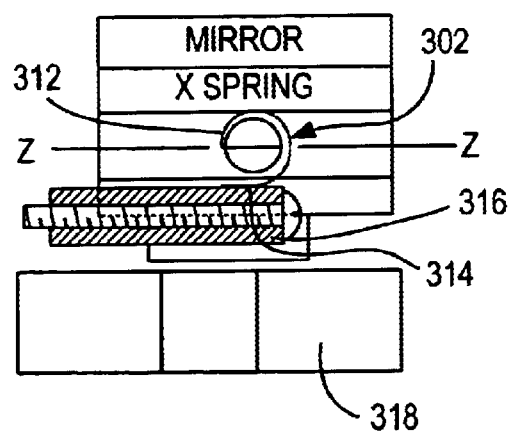
Figure 9:
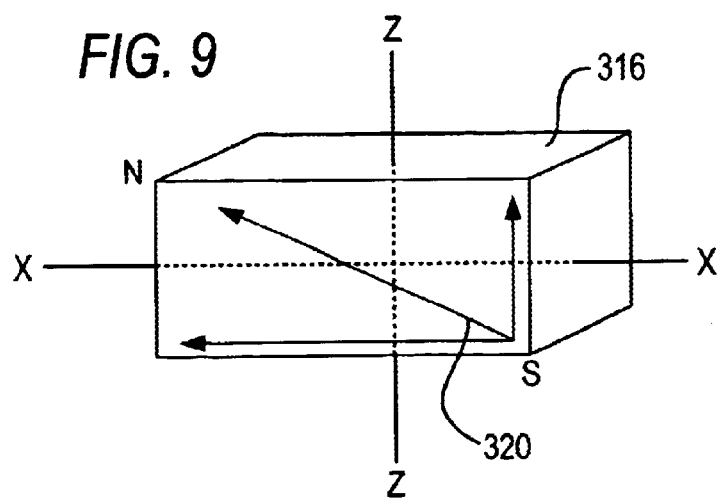

FIGS. 8 and 9 illustrate two-dimensional scanning devices employing spiral springs. As shown in FIG. 8(a) a mirror 300 is attached at one end of a first spiral spring 302. The distal end of the first spiral spring 302 is attached to a first shaft 304 (for example, by inserting an end portion of the spring into a slot 306 in the shaft as shown in the Figure). The first shaft 304 is itself attached to a second shaft 308 mounted for rotation about an axis X—X. The second shaft 308 is carried by a pair of spiral springs 310 and 310'. One end of each of the pair of spiral springs 310 and 310' is attached to the second shaft 308. Such attachment of spring 310 is shown at 312. The distal ends 314 and 314' of the pair of spiral springs are attached to the base of the assembly.

A magnet 316 is attached to the first spiral spring at a location on the opposite side of the shaft 304 from the mirror 300. Advantageously, the magnet and mirror are positioned and configured to have balanced weights and moments of rotational inertia. A coil 318 is located in the assembly to exert a driving force on the magnet.

The magnet 316 may be magnetized in the manner indicated by the magnetization vector 320 in FIG. 9. By suitable application of current to the coil the magnet may be driven so as to oscillate the mirror 300 in two dimensions. Such a two-dimensional moving mirror assembly may be suitable for reading two dimensional optical codes such as the PDF symbology.

Figure 10:
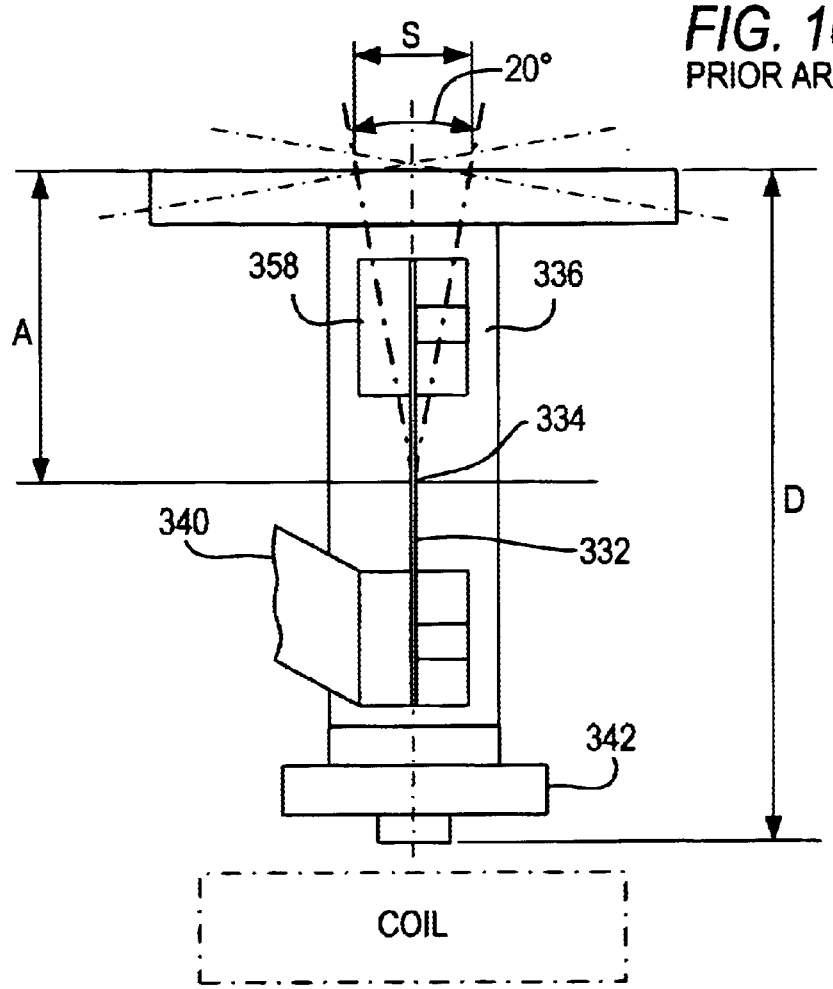
FIGS. 10 and 11 are views of leaf spring and spiral spring based scanning devices, respectively, illustrating certain dimensional comparisons.
Figure 11:
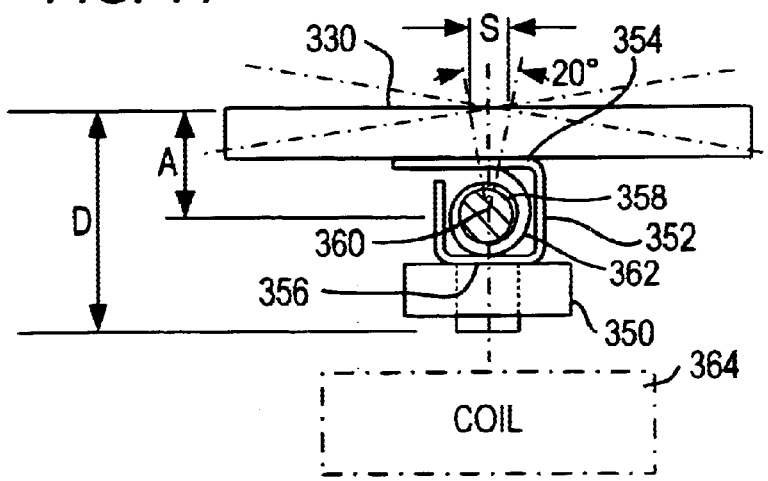

FIGS. 10 and 11 illustrate certain dimensional and functional differences between a conventional Mylar leaf spring scan mirror suspension (FIG. 10) and a spiral metal spring scan mirror suspension (FIG. 11) of an embodiment of the present invention.

Both systems employ the same size scan mirror 330 which is oscillated through the same angular range (20°).

In the case of the prior art system of FIG. 10, the mirror 330 is mounted on a flat mylar leaf spring 332 creating an effective axis of rotation 334. One end of the spring 332 is attached to an arm 336 at mounting block 338. The other end of the spring is attached to a mounting block 340 fixed to the base. An upper end of the arm 336 is attached to the mirror 330, while the lower end of the arm is attached to a magnet 342. A coil 344 drives the system in oscillation.

For comparison purposes, an embodiment of the present invention is illustrated in of FIG. 11. In the Figure, the mirror 330 and magnet 350 are attached at opposite sides of a bracket 352. The bracket may be configured in the shape of a tube of rectangular cross section as shown in the Figure to provide flat faces 354 and 356 for attachment of the mirror and magnet respectively. A shaft 358 having an axis of rotation 360 is located inside the bracket 352. The bracket is rotatably attached to the shaft by a spiral tape spring 362. The system is driven by coil 364.

It will be observed from a comparison of FIGS. 10 and 11 that the same angular scanning range (20°) can be achieved with the same size mirror in a much smaller package employing the techniques illustrated in FIG. 11. The depth D of the moving mirror assembly is much smaller in the system of FIG. 11 than in the system of FIG. 10. A three-fold reduction in the dimension D may be achieved. Likewise the moment arm A is shorter in the device of FIG. 11 than in that of FIG. 10. Further, the side to side travel S of the mirror may be reduced by a factor of three. In a preferred embodiment of FIG. 11 the dimensions are as follows: D=0.21 inch, A=0.10 inch and S=0.035 inch. These reduced dimensions result in a substantial reduction in overall size and energy consumption of the scanner module.

Figure 12:
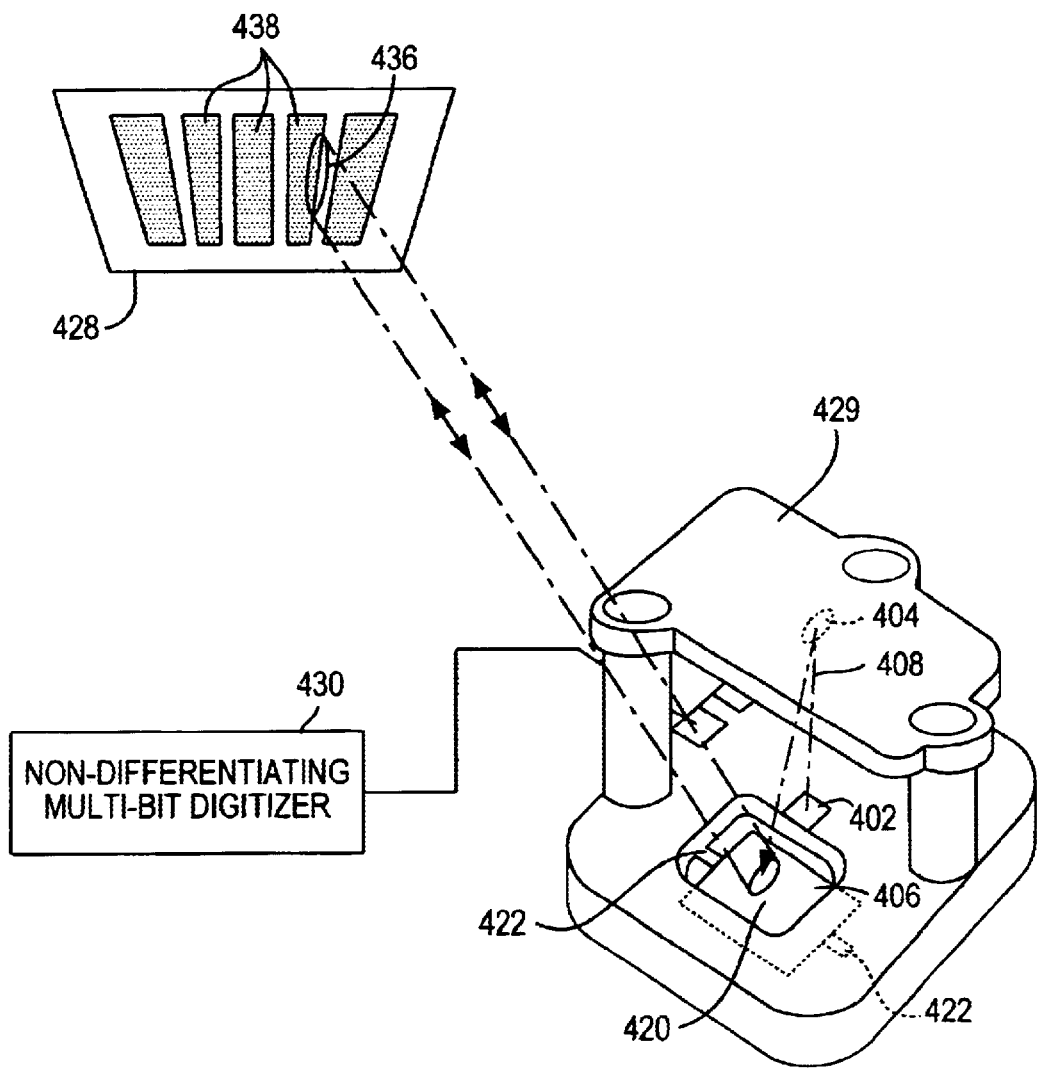
FIG. 12 is a pictorial view in partial cross section of components of a compact scanning module of a preferred embodiment of the present invention.

FIG. 12 illustrates techniques for providing a compact bar code scanning module in accordance with other preferred embodiments of the present invention. The embodiment of FIG. 12 employs a vertical cavity surface emitting laser diode assembly ("VCSEL") 402 as a source of laser light, focusing mirror 404, a micro machined scanning element 406 and detector 407.

The VCSEL emits a laser beam 408 from the top surface of an VCSEL chip. The laser beam is generated in a cavity having multiple layers of mirrors and active laser semiconductor material typically formed epitaxially on a substrate. The VCSEL produces a generally circular spot lacking in astigmatism. In contrast, edge emitting diodes conventionally used in laser scanners typically produce an elliptical spot which is astigmatic. VCSELs have numerous advantages over edge emitting diodes, particularly in the context of compact scanning modules. These advantages include the reduced electrical power requirements, small size and simplified compact mounting capabilities. The VCSEL chip can be surface mounted as shown in FIG. 12 or encapsulated in a package with a window.

Miniaturization of scanning modules may also be accomplished in part by employing micro machined moving mirror structures such as described in U.S. patent application Ser. No. 09/035,763, entitled *"Control System For Oscillating Optical Element In Scanners"* to Giebel et al., assigned to applicant, and hereby incorporated by reference.

FIG. 12 includes a pictorial view of the scan element 406. The scan element may be an electrostatically driven micro machined scan element. The scan element 406 can be manufactured using either monolithic integration or hybrid integration techniques. In a preferred embodiment, the scan element is fabricated on a substrate. The substrate may be a semiconductor material such as silicon and the micro machined mirror fabricated using known VLSI technology.

The scan element 406 of FIG. 12 consists of a scan mirror 420 suspended by two electrically conductive torsional hinges over two substrate electrodes (not shown). The mirror is rotated about its hinges by applying a voltage to one electrode (drive pad) thereby producing an electrostatic force between the drive pad and the mirror. When a voltage is applied and removed from the drive pad, the mirror scan element acts as a driven torsional oscillator and the mirror 420 rotates about an axis defined by its hinges. The rest position of the mirror 420 is shown in FIG. 12 and is a position in which the principal plane of the mirror is parallel to the principal plane of the substrate. The scan element is designed to rotate about its axis by approximately +/−10 degrees from the rest position, at a frequency of less than 100 Hz and preferably at a frequency of between 20 and 30 Hz.

Another electrode (pick-up pad) is used for sensing the position of the mirror. The position of the mirror is detected by sensing the capacitance between the pick-up pad and the mirror. This capacitance varies in inverse proportion to the distance between the mirror 420 and the pick-up pad.

During operation, a voltage is applied to drive pad, which applies an electrostatic force to rotate the mirror 420. The applied voltage creates charges of opposite polarity between the drive pad and the mirror 420. The resulting attractive force pulls the closer side of the mirror 420 downward, thus rotating the mirror 420 about its rotation axis.

Alternatively, the mirror may be rotated by application of electromagnetic force. Magnetic field sensing may be used in conjunction with appropriate circuitry to determine mirror motion and control the mirror driver.

The system shown in FIG. 12 is retro reflective, i.e. light reflected by the bar code 428 impinges on the mirror 420, from which it is reflected to the collection mirror 429. It will be apparent, however, that the teachings of the present invention may be applied to non retro reflective systems in which light reflected by the bar code system does not return to the moving optical element, but is instead directed along a fixed beam path to a lens and photo diode. In either case, the detector communicates with circuitry 430, which extracts digital data from the signal produced by the detector.

Reduction in the size of the scanner module typically necessitates reduction in the detector collection area. In the embodiment of FIG. 12, the size of the collection area is limited by the size of the moving mirror 420, which may be limited to the collection area of less than 10 square millimeters, for example mirrors of the dimensions 3 mm by 3 mm or 3 mm by 2 mm. Generally smaller collection areas result in smaller spatial averages of the area of the bar code being scanned. This, in turn, increases susceptibility to speckle noise.

The embodiment of FIG. 12 implements a number of techniques for reducing speckle noise while reaping the advantages of miniaturization and use of VCSELS. First, a shorter wavelength laser diode may be employed to reduce spot spread on the detector. This, in turn, reduces speckle noise. For this purpose a 630 nm laser diode will appreciably reduce speckle noise from the levels produced with a conventional 670 nm laser diode. A reduction of about 6% is achievable. Further improvements may be achieved by using shorter wavelength laser diodes such as blue or violet laser diodes being developed for optical disc readers.

As noted above, VCSELS typically produce circular non-astigmatic spots. As shown in FIG. 12, an elliptical laser spot may be formed. A focusing mirror 404 may be formed with a cylindrical or toric surface to produce an astigmatic elliptical spot 436. In general, the amount of cylindrical power that needs to be introduced is relatively small (e.g. <4%). Hence the lens can be generally spherical with a controlled amount of astigmatism. Advantageously, the elliptical spot 436 is aligned with its major axis parallel to the principal axes of the bars 438 which make up the bar code 428. Alternatively, a dithering technique may be employed to rapidly move the spot in a direction generally parallel to the principal axes of the bars (i.e. perpendicular to the scanning direction). See U.S. Pat. No. 5,648,649 to Bridgelall, which is hereby incorporated by reference.

It will be understood that the VCSEL assembly 402 may include an aperture and lens. The aperture may be located closest to the VCSEL. Alternatively, the lens may be located closest to the VCSEL. The aperture may be formed directly on the lens by optical molding techniques (e.g. using a molded plastic lens). Alternatively, the aperture may be formed as a part of the window of the VCSEL package and thus become an integral part of a VCSEL module.

A non-differentiating digitizer is used to avoid enhancing speckle noise with a differentiator. A system may be provided which is switchable between a differentiating mode and a non-differentiating mode, the non-differentiating mode being used for reading bar codes relatively close to the scanner where speckle noise is more of a problem. A signal processor is disclosed in U.S. Pat. No. 6,328,213 which is hereby incorporated by reference herein.

A non-differentiating digitizer is used to avoid enhancing speckle noise with a differentiator. A system may be provided which is switchable between a differentiating mode and a non-differentiating mode, the non-differentiating mode being used for reading bar codes relatively close to the scanner where speckle noise is more of a problem.

An offset correction circuit may be employed to prevent saturation of the analog chain in bright ambient light, when using a non-differentiating digitizer. A multi bit decoder, or waveform decoder may be employed to reduce the effects of speckle noise. A multi-bit decoder which may be adapted to reduce speckle noise in the small collection area systems of embodiments of the present invention is shown in U.S. Pat. No. 5,734,152 to Goren et al., which is hereby incorporated by reference. Alternatively, or in addition, waveform decoding may be used. In waveform decoding, the detector signal is applied to an A/D converter to sample the signal at, for example, a 200 K to 300 K Hz sample rate. The sample waveform data may be processed in a micro processor to simulate various filters and filter cut offs to identify the filter best suited to recovering the bar code edge data. A technique for analog waveform decoding is disclosed in U.S. Pat. No. 5,504,318 to Joseph et al., the contents of which are hereby incorporated by reference.

A digitizer is disclosed in U.S. Pat. No. 5,637,853 to Joseph, which is hereby incorporated by reference. In the system of the '853 patent, the information encoded in the bar code can be recovered by identifying the noisy and noise-free portions of the signal. This technique may be adapted to reduce speckle noise in the small collection area systems of embodiments of the present invention.

Figure 13:
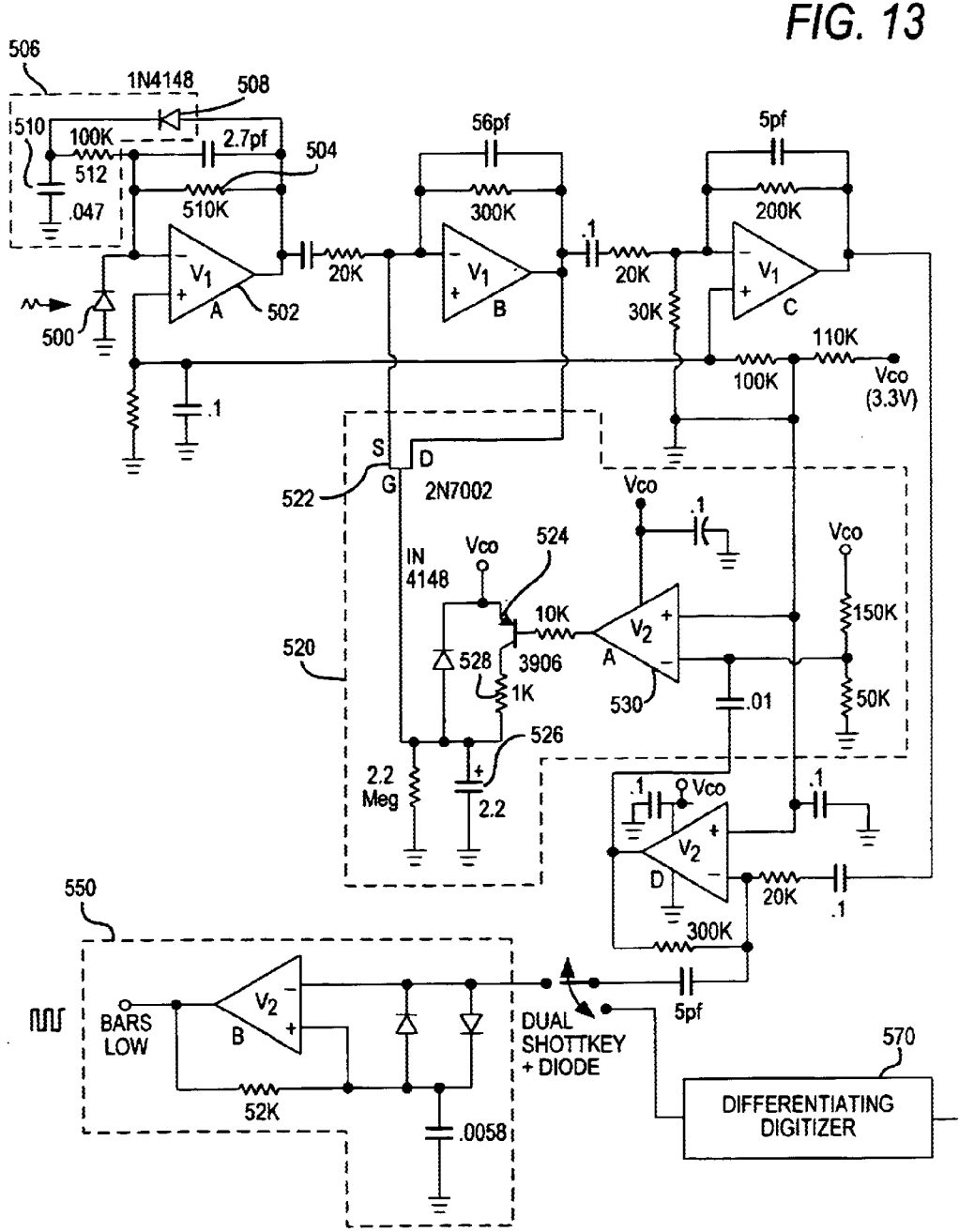
FIG. 13 is a schematic circuit diagram of an embodiment of the present invention including amplifiers, a digitizer and automatic gain control.

FIG. 13 is a schematic circuit diagram of an embodiment of the present invention showing amplifier circuitry with the automatic offset correction feature and a non-differentiating digitizer. FIG. 13 also includes automatic gain control circuitry of a preferred embodiment which can be used to increase the working range of a scanner using this circuitry. The circuit of FIG. 13 is adapted for use in small collection area systems (both retro reflective and non-retro reflective).

A photo diode light detector 500 is connected to a photo diode amplifier 502, which in the disclosed embodiment may be the A section an Lmv 324 operational amplifier integrated circuit. A 510 K resistor, 504, sets the gain of the amplifier 502 to a high level to minimize noise that is generated by the circuitry components. At this high gain, a non-retro system will saturate in high ambient light conditions, e.g. sunlight. Even most retro systems will saturate unless special attention is given to the design to minimize the field of view. This is undesirable because it adds cost to the system. In most cases it will be less expensive to add offset correction circuitry 506. The correction circuitry is described as follows.

When the scanner is used in the dark, or under indoor lighting conditions, the voltage at the output of amplifier 502 is only a few millivolts higher than the voltage at the inverting (−) input. This is not enough voltage to forward bias on IN4148 diode (508) in the offset correction circuit. Under these circumstances, the offset correction circuit does nothing and the amplifier acts as if the correction circuit did not exist.

If the ambient light level is increased, the voltage at the output of amplifier 502 swings more positive until the diode 508 eventually becomes forward biased. At this point, a 0.047 $\mu$f capacitor 510 begins to be charged by the diode 508. The voltage on this capacitor is applied to the inverting input of the amplifier through a 100 K ohm resistor 512, which causes the amplifier's output to swing towards ground, reducing the offset. The brighter the ambient light, the more positive the amplifier output tries to swing, the more the capacitor is charged and the greater the amount of correction applied.

This circuit 506 does not correct 100 percent of the offset. Only enough correction is applied to prevent saturation. This circuit only corrects low frequency or D.C. offsets. This is because the capacitor 510 and diode 508 act as a peak detector. The capacitor 510 charges to the highest offset voltage that occurs (minus the 0.7 volt diode voltage drop) and applies this voltage through the 100 K resistor 512 as an offset correction. The correction circuitry does not respond to higher frequencies. If it could follow the higher frequencies present in the detector signal caused by scanning a bar code, it would subtract out the desired signal and disrupt operation of the system.

An automatic gain control circuit 520 receives the amplified, offset corrected signal. The AGC circuit regulates the amplitude of the signal that is being provided to the digitizer. This assures that the digitizer has a signal whose amplitude is within the range that the digitizer can process properly. The AGC compensates for variations in signal levels that result from scanning symbols of different contrasts and from scanning symbols at different distances.

The AGC circuit 520 varies the gain of one of the amplifier stages by using a field effect transistor (FET) 522 in the feedback loop of that amplifier as a variable resistor. In some embodiments the amplifier stage whose gain is varied will be doubling as a differentiator.

The AGC circuit works by comparing the peak amplitude of the signal to a reference voltage. If the peaks exceed the reference voltage, the voltage applied to the gate of the FET 522 is increased which reduces its resistance, dropping the amplifier gain until the signal no longer exceeds the reference voltage.

This AGC design of FIG. 13 differs from previous designs in that it is designed to operate at the low power supply voltages that are becoming more common in small battery powered equipment. The circuit of FIG. 13 is designed to operate using a 3.3 volt power supply, but it can function at under 3.0 volts.

The AGC circuit needs to vary its gain over a large range. This means the FET 522 must vary its resistance between nearly fully turned on, for low gain, and turned off for high gain. Accordingly, the circuitry needs to be able to apply enough voltage to the FET gate to turn it fully on.

The 2N7002 FET chosen is relatively inexpensive. This transistor needs as much as 2.5 volts to turn it on, so the AGC circuit needs to be able to apply, at least 2.5 volts even with the desired low power supply voltage.

The circuit of FIG. 13 enables this by biasing the variable gain stage to only 150 mv above ground. The gate can be pushed up to within ground 50 mv of the positive supply valve by transistor 524 which allows a total of about 3.2 volts to be applied between the source and gate with a power supply voltage of 3.3 volts.

Prior AGC circuit designs biased the variable gain stage at around half the power supply voltage. This would allow 2.5 volts to be applied to the FET gate if the power supply was five volts, but would only allow a gate voltage of 1.65 volts (half of the supply voltage) with a 3.3 volt power supply.

In actual practice, even this would not have been possible with other designs because the gate voltage is not applied by a saturating transistor such as transistor 524 as in the design of FIG. 13, which can pull the gate up to within around 50 mv of the power supply. With less than 2.5 volts available to turn on the FET, the prior circuits required a more expensive FET with a lower gate voltage requirement. If this type circuit design were to be used on a 3.3 volt power supply, only 1.25 volts could be applied to the FET gate. Applicants are not aware of any FET's that can operate at this low a gate voltage.

A feature of this AGC design is that it shifts the variable gain stage towards ground and uses a saturating transistor to pull the gate of the FET up close to the positive power supply voltage. This enables the circuit to apply almost the full power supply voltage to the gate. This allows the circuit to function at lower power supply voltages than previous circuits without requiring the use of more expensive FETs that can operate with lower gate voltages.

Another feature of the AGC circuit is that the voltage applied to the gate of the FET is developed by charging capacitor 526 with current pulses from transistor 524 through the 1 K resistor 528. To change capacitor 526 to a higher voltage, transistor 524 pulses on more frequently. Former designs used a linear peak detector instead of this rapid on-off switching.

There are FETs available with polarities that are opposite to the 2N7002. These FETs require that the gates be pulled negative with respect to the source to be turned on, as opposed to positive for the 2N7002 FET. One can obtain the same function with one of these FETs by essentially inverting the circuit. In such a circuit the variable gain stage will be offset close to the positive power supply voltage and charge the capacitor 526 by pulling it towards ground with an NPN transistor instead of the PNP transistor 524 shown in FIG. 13.

There are also FETs that are normally on and need to have a voltage applied to the gate to turn them off. One can modify the circuit of FIG. 13 so it operates with this kind of FET.

Another alternative form of the circuit of FIG. 13 involves replacing comparator 560 with a micro processor. Many micro processors today have on-board A to D converters and on-board pulse width modulation outputs. With this kind of micro processor, the signal amplitude can be monitored via the A to D converter, and the gain corrected by controlling transistor 524 with the pulse width modulated (PWM) output of the micro processor, which would vary the voltage applied to the gate of the FET as necessary to obtain the desired gain.

In the circuit of FIG. 13, an undifferentiated, gain controlled analog signal is applied to a non-differentiating digitizer circuit 550. The digitizer circuit shown has been used in conventional optical code readers including laser scanners. However, this type of digitizer is rarely used in conventional laser scanners, because differentiating digitizers are normally thought to provide better working ranges.

Applicants have observed that in small sized scanners, working range is generally not a primary requirement. Tests and analysis have shown that a non-differentiating digitizer can work better than differentiating digitizers when speckle noise is high as long as the scanner is being used within the range where the laser spot is not much larger than the small bars in the symbol being scanned. This is the most commonly used part of the working range of a scanner.

The output signal of the non-differentiating digitizer is a digital bar pattern of the general type indicated i.e. a two level square wave signal of varying width corresponding to the detected bar code pattern. To the extent that the system responds to speckle noise, the speckle noise will create narrow bars which can be readily rejected in subsequent processing circuitry. The non-differentiating digitizer may provide the best system performance at short scanning distances, for example less than 8 inches.

However, if larger range is desired, a symbol positioned far enough from the scanner to allow the laser spot to grow larger than the smallest bars in the symbol can be better scanned using a differentiating digitizer. It will be understood that a differentiating digitizer will tend to sharpen up rounded analog signals caused by a scanning spot larger than the bar width of the symbol. For such longer range applications, a conventional differentiating digitizer 570 may be substituted for the non-differentiating digitizer for example, by manual actuation of a switch 572.

Scanners using micro machined motors may be retro reflective and non-retro reflective. Both kinds of scanners using micro machined motors will typically use small light collection areas. Otherwise the advantage of size reduction offered by the micro machined motor will be lost. Therefore the above features will be advantageous in both types of systems with micro machined scan motors. The offset correction circuit is particularly useful with a non-retro reflective scanner as it allows the use of a larger feedback resistor in the photo diode amplifier, for lower noise, than would otherwise be possible in a non-retro reflective system.

Another technique for reducing the effects of speckle noise is illustrated in FIGS. 14, 15(a) and 15(b). As noted above, with small devices and small laser spots, speckle noise may be a problem. By creating both a spot and a halo from the same laser, speckle noise may be reduced without increasing signal.

An implementation of this approach is shown in FIG. 14. In the Figure, a laser spot 602 is shown as projected at a typical location in a printed pdf code 600. However, it should be understood that these aspects of the invention may be employed in reading both one and two dimension bar codes where collection area is limited. A halo 604 around the beam is indicated as the area within circle C. A corresponding beam intensity profile is shown in the Figure. The Halo portions 606 are of relatively low intensity, while the spot portion 608 is of relatively high intensity. Advantageously, the halo should be much larger than the bar code feature size and, preferably, as big as the field of view of the detector of the bar code scanner. The halo should also contain enough laser power (from ⅓ to ½ of the laser power) so that speckle noise can be reduced significantly.

It is known that a larger spot size reduces speckle noise. However, available spot sizes are limited by, among other things, symbol feature size. This is particularly true in pdf symbology, since an elongated or elliptical spot cannot be employed. It is expected that the spot and halo beam described here will reduce speckle noise and improve scanner performance, even if there is a slight reduction in modulation due to the fact that the halo will impinge many features and both black and white areas.

Examples of laser and optical element assemblies which may be used to produce the spot and halo of FIG. 14, are shown in FIGS. 15(a) and 15(b). In FIG. 15(a) a laser diode 620 or other source of a symbol scanning light beam is shown mounted in a tube 622. A composite lens 624 is provided to produce a central spot and surrounding halo. The composite lens 624 is centered on the optical axis A—A. In a preferred embodiment the composite lens is a positive lens having a central portion 626 with a relatively short focal length $f_1$ and a surrounding annular portion 628 having a relatively longer focal length, $f_2$. In a preferred embodiment the surfaces of both portions are spherical, the central portion 626 is approximately 1 mm in diameter and the annular portion 628 is approximately 2 mm in diameter. The focal length $f_1$ may be, for example, 3 mm and the focal length $f_2$ may be, for example, 10 mm.

In preferred embodiments, the halo increases in size with distance from the scanner and may, for example, be 1" in diameter at a distance of 20" from the scanner, and a diameter of ½ inch at a distance of several inches from the scanner. Because of its size, the power density of the halo is relatively low, and not readily visible to the operator. It would not, therefore, create its own safety concerns, nor would it suggest to the operator that the system is improperly focused or malfunctioning.

Long range axicon beams have also been shown to improve signal-to-speckle-noise ratios. The properties and projection of axicon beams are discussed in U.S. Pat. No. 5,331,143 to Marom et al. and assigned to Symbol Technologies, Inc., which patent is hereby incorporated by reference.

In FIG. 15(b) an alternate embodiment is shown for producing the laser spot and halo of FIG. 14. A laser diode 630 or other source of a symbol scanning light beam is shown mounted in a tube 632. A positive collimating lens 634 is located on the optical axis B—B of the device and receives light emitted from the laser diode 630. A second negative lens 636 is formed with a central aperture 638 centered on the optical axis B—B, though which a central laser beam spot passes. The annular lens 636 surrounding the aperture creates a slightly diverging halo around the central beam spot. In preferred embodiments, the diameter of the aperture 638 may be 1 mm and the diameter of the lens 636 may be 2 mm.

From the embodiments of FIGS. 15(a) and 15(b) it will be apparent that various optically equivalent structures may be employed to produce the laser beam of FIG. 14, including systems employing multiple lenses, lens surfaces, spherical, toric or axicon lenses, powered mirrors, diffractive elements, etc.

While aspects of the present invention have been described with reference to preferred embodiments and examples, the invention to be protected is defined by the literal language of the following claims and equivalents thereof.

We claim:

1. In a reader for electro-optically reading a bar code symbol, the symbol comprising bars and spaces of different light reflectivity and having specific relative widths, by sweeping a laser spot across the symbol for reflection therefrom, by detecting laser light reflected from the symbol, and by generating an analog electrical signal indicative of the laser light detected, an arrangement for reducing speckle noise influence in the analog signal, the arrangement comprising:
   a) a laser emitter for emitting a laser beam to form the laser spot on the symbol with a circular spot size having a diameter at least twice a width of a bar having the narrowest width in the symbol; and
   b) a decoder including a non-differentiating digitizer for processing the analog signal into an output signal having transitions which correspond to boundaries between adjoining bars and spaces.

2. The arrangement of claim 1, wherein the emitter comprises a laser diode for generating the laser beam with a wavelength of 630 nm.

3. The arrangement of claim 1, wherein the emitter comprises a vertical cavity surface emitting laser diode.

4. The arrangement of claim 1, wherein the emitter includes a focusing lens for forming said spot size on the symbol.

5. The arrangement of claim 1, wherein the reader detects the laser light reflected from the symbol over a collection area of less than 10 square millimeters.

6. The arrangement of claim 5, wherein the collection area is on a collection mirror having dimensions of 3 millimeters by 3 millimeters.

7. The arrangement of claim 1, wherein the non-differentiating digitizer produces a digitized signal as a two-level square wave of varying widths.

8. The arrangement of claim 1, wherein the reader is operative for reading the symbol within a working range of less than eight inches.

9. In a method of electro-optically reading a bar code symbol, the symbol comprising bars and spaces of different light reflectivity and having specific relative widths, by sweeping a laser spot across the symbol for reflection therefrom, by detecting laser light reflected from the symbol, and by generating an analog electrical signal indicative of the laser light detected, a method of reducing speckle noise influence in the analog signal, the method comprising the steps of:
   a) emitting a laser beam to form the laser spot on the symbol with a circular spot size having a diameter at least twice a width of a bar having the narrowest width in the symbol; and
   b) digitizing the analog signal with a non-differentiating digitizer into an output signal having transitions which correspond to boundaries between adjoining bars and spaces.

10. The method of claim 9, wherein the emitting step is performed by generating the laser beam with a wavelength of 630 nm.

11. The method of claim 9, wherein the emitting step includes focusing the laser beam to form said spot size on the symbol.

12. The method of claim 9, wherein the laser light reflected from the symbol is collected over a collection area of less than 10 square millimeters.

13. The method of claim 9, wherein the collection area has dimensions of 3 millimeters by 3 millimeters.

14. The method of claim 9, wherein the non-differentiating digitizer produces a digitized signal as a two-level square wave of varying widths.

* * * * *